Figure 1:
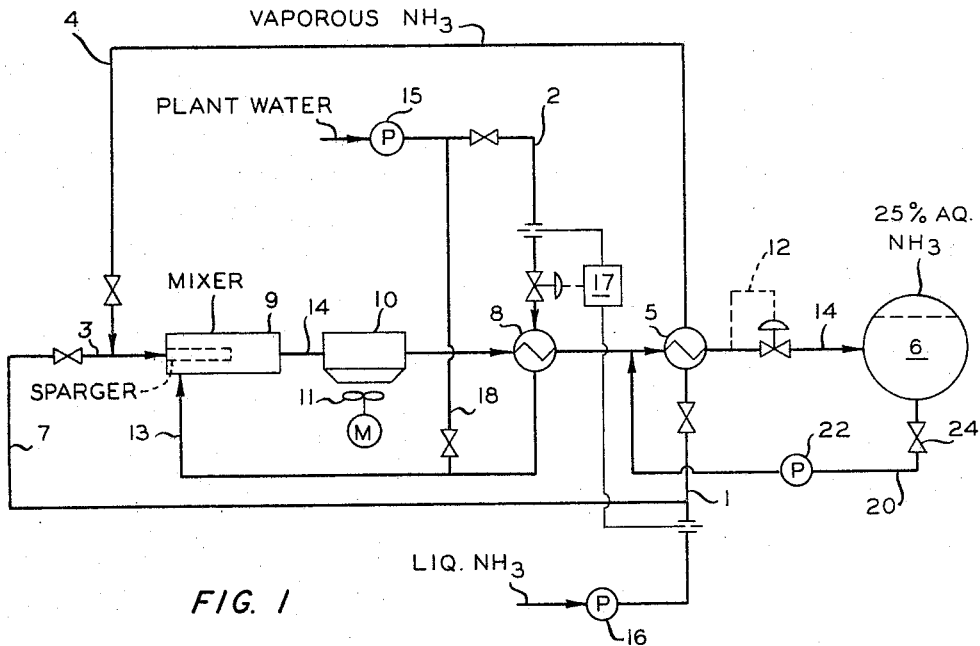

Jan. 3, 1967     G. C. EARLEY     3,295,927

AQUA AMMONIA PRODUCTION

Filed Oct. 21, 1965

*INVENTOR*
G. C. EARLEY
BY *Young & Quigg*

*ATTORNEYS*

United States Patent Office 3,295,927
Patented Jan. 3, 1967

---

3,295,927
AQUA AMMONIA PRODUCTION
George C. Earley, Bartlesville, Okla., assignor to Phillips Petroleum Company, a corporation of Delaware
Filed Oct. 21, 1965, Ser. No. 500,055
8 Claims. (Cl. 23—193)

This application is a continuation-in-part of application Serial No. 194,344, filed May 14, 1962, now abandoned.

This invention relates to the production of aqueous ammonia from anhydrous ammonia. In one aspect it relates to the production of aqueous ammonia from anhydrous ammonia in areas in which water is in short supply or not easily available. In another aspect it relates to apparatus and a method for production of concentrated solutions of aqueous ammonia from anhydrous liquid ammonia at locations at which immediately available water is in short supply.

By the term liquid ammonia as used throughout this specification and claims is meant anhydrous or substantially anhydrous liquid ammonia. Anhydrous liquid ammonia is produced in large volumes for fertilizer purposes. Much of the fertilizer ammonia is used in areas far removed from points of manufacture and transportation becomes an important item. It is preferable to ship the ammonia in its original liquid or anhydrous form and to produce the aqua ammonia therefrom for use as a fertilizer at a point at least near the area in which it is to be used. Usually, a 10,000 gallon (about 25 tons) tank car of liquid ammonia is spotted on a railroad siding in the farm area to be supplied and a portable aqua ammonia plant on a truck chassis is driven to the tank car locus and produces the aqua ammonia at the site.

An object of this invention is to provide a method and apparatus for the production of aqueous ammonia from anhydrous ammonia. Another object of this invention is to provide apparatus and a method for production of aqueous ammonia from anhydrous ammonia in areas in which water is in short supply or not easily available. Yet another object of this invention is to provide a method and apparatus for the production of concentrated solutions of aqueous ammonia from anhydrous ammonia wherein the water added to the anhydrous ammonia is the only water used in the heat exchange steps or the only liquid heat exchange medium used. Other objects of the invention will become apparent to one skilled in the art upon consideration of the accompanying disclosure.

It is well known that solution of liquid or anhydrous ammonia in water, or vice versa, is highly exothermic and upon mixing of liquid ammonia and water, the temperature of the resulting aqueous solution becomes quite high. In order to obtain reasonably high concentrations of ammonia in aqueous solutions it becomes necessary to provide large amounts of heat exchange in the form of cooling. It is advantageous to cool the produced aqueous solution of ammonia to a temperature very nearly atmospheric so that the solution can be stored in vessels at substantially atmospheric pressure. It is quite advantageous to store such solutions at substantially atmospheric pressure to avoid the high cost of vessels suitable for storage under pressure.

In areas in which abundant water for cooling purposes is easily available the usual practice is to cool the aqueous solution in indirect heat exchange with water and pass the heat exchanged water to a cooling pond or to waste. In areas of short water supply such practice cannot be tolerated. In one area in a north central state, water for production of aqueous ammonia has to be shipped in by tank car. It is in such an area that this invention has particular utility.

According to this invention I have devised a process for the production of concentrated aqueous ammonia solutions from anhydrous ammonia involving the use of water for cooling in which the only water used is that subsequently contained in the final aqueous ammonia product. To remove the heat of solution from the hot aqueous ammonia, I heat exchange the hot aqueous ammonia with the water to produce warm water and to cool the aqueous ammonia. In accordance with one embodiment of the invention, I then vaporize the liquid ammonia in heat exchange with the partially cooled aqueous ammonia for the production of relatively warm ammonia vapor and finally cooled aqueous ammonia. Next, under suitable pressure I dissolve the warm vaporous ammonia in the warm water. With these feed materials at higher than normal temperature I obtain hotter than usual aqueous ammonia. Under this condition atmospheric cooling of the very hot aqueous ammonia is quite efficient. In other words, I produce the aqueous ammonia at the higher than normal temperatures so that I can remove much of the heat of solution by atmospheric cooling. I then finish the cooling to a suitable storage temperature by heat exchange with the process water and, in accordance with a first embodiment of the invention, finally with the vaporization of the process liquid ammonia.

In accordance with another embodiment of the invention, the feed water to the plant is indirectly heat exchanged with the aqua ammonia product stream downstream of the atmospheric cooling step to cool the product stream to a suitable storage temperature and there is no further cooling of this stream by indirect heat exchange with the vaporizing ammonia fed to the process. This embodiment of the invention is suitable for use in any area where relatively cold water is naturally available as feed to the process. In Southern areas where cold spring water or deep well water is available in the summer months and in Northern areas where water temperature is suitable the year round, it has been found that this embodiment of the invention (without ammonia cooling) functions efficiently and economically to cool the aqueous ammonia for storage to a temperature at least as low as atmospheric temperature. The air fin cooler brings the aqua ammonia temperature down to within 10 or 15° of atmospheric temperature so that the substantially colder water (than atmospheric) further reduces the aqua ammonia temperature to a temperature at least as low and usually considerably lower than atmospheric temperature.

Figure 2:
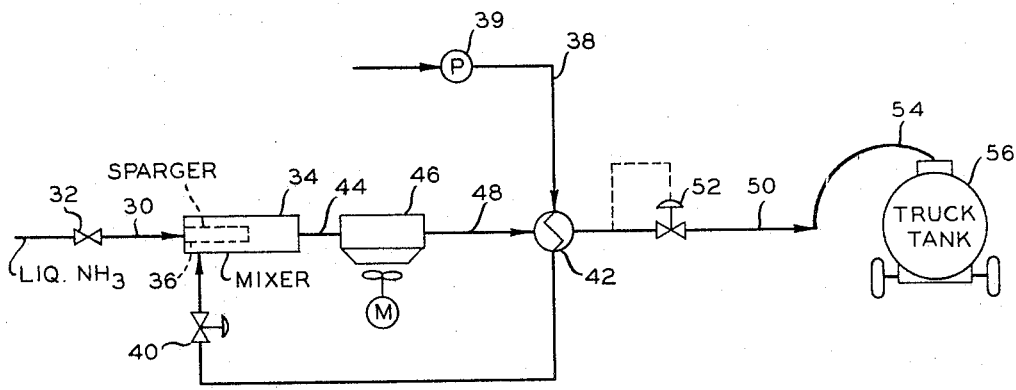

A more complete understanding of the invention may be had by reference to the accompanying schematic drawing of which FIGURE 1 shows an arrangement of apparatus or flow in accordance with the first embodiment of the invention and FIGURE 2 is a similar view showing an arrangement of apparatus and flow in accordance with the second embodiment of the invention.

Referring to FIGURE 1 of the drawing, numeral 1 identifies a conduit through which liquid ammonia is passed from a source, not shown, to the system subsequently described. Depending upon the pressure maintained in the system, a pump 16 may or may not be required. As is well known, ammonia exists as a liquid only under a superatmospheric pressure at normal atmospheric temperature. This liquid ammonia passes through conduit 1 and is heat exchanged in an indirect heat exchanger 5 with a partially cooled solution of ammonia in water. In this heat exchanger 5 it is intended that all or at least some of the liquid ammonia should be vaporized with the production of relatively warm vaporous ammonia.

Water for use in the production of aqueous ammonia originates from a source, not shown, and is passed through a conduit 2 to the system. A pump 15 is provided for this transfer of water. From pump 15 the water flows on through conduit 2 to a heat exchanger 8 in which relatively warm aqueous ammonia is heat exchanged with this water. The partically cooled aqueous ammonia from heat exchanger 8 is the feed aqueous ammonia to the above-mentioned heat exchanger 5. In exchanger 8 the water is warmed to a temperature considerably above atmospheric temperature and from this exchanger the water flows through a conduit 13 into a mixer 9.

The warm vaporous ammonia from conduit 4 passes through a conduit 3 into the mixer 9 containing a sparger. The mixer 9 will not be described in detail because such apparatus for dissolving one liquid in another liquid or for dissolving a gas in a liquid is well known in the art. Thus the vaporous ammonia passes through conduit 3 into mixer 9 and it is dissolved in the water therein to provide the aqueous ammonia solution. This mixer is maintained under suitable superatmospheric pressure so that the solution therein will not boil. The thus produced very hot solution passes from mixer 9 through a conduit 14 into an atmospheric heat exchanger 10. Preferably this heat exchanger 10 is an air fin heat exchanger having a relatively large surface area. Air is forced over this heat exchanger by a motor-driven fan 11. The hot aqueous ammonia is cooled to a marked degree by passage through the air fin heat exchanger and this partially cooled aqueous ammonia then is cooled further in the above-mentioned heat exchanger 8 with the process water and it is further cooled to a temperature suitable for atmospheric storage in the heat exchanger 5 in which the processed liquid ammonia is vaporized.

A back pressure regulator 12 is provided in conduit 14 on the downstream side of the heat exchanger 5 for the purpose of maintaining sufficient pressure in mixer 9, heat exchanger 10, heat exchangers 8 and 5 so that the solution in these vessels will not boil. However, by the time the solution leaves heat exchanger 8 or heat exchanger 5 its temperature is well below the boiling temperature for atmospheric storage. On flowing through back pressure regulator 12 the finally cooled aqueous ammonia passes on to a storage vessel 6 in which pressure of only several inches of water is maintained. If desired, storage tank 6 can be maintained under atmospheric pressure by provision of a small diameter vent tube in the tank roof.

Line 20, containing pump 22 and valve 24, connects tank 6 with line 14 intermediate exchangers 5 and 8. This arrangement is used when heat exchanger 5 is used to cool the aqua ammonia to a temperature considerably below atmospheric temperature. By recycling aqua ammonia in this manner the stored liquid is refrigerated.

The second embodiment of the invention may be performed in the arrangement of FIGURE 1, wherein the heat exchanger 5 is not employed and the valve in conduit 1 is closed and the valve in conduit 7 is opened so that liquid ammonia as such is passed through conduit 7 and through conduit 3 into the mixer 9. Also the valve in conduit 4 is closed in this case. In this embodiment water is heat exchanged with the finally produced hot aqueous ammonia in exchanger 8 and this hot water is thus employed in the mixer for dissolving the liquid anhydrous ammonia. The thus produced hot aqueous ammonia is passed by way of conduit 14 is markedly cooled in the air fin heat exchanger 10 to such an extent that final cooling by the water in heat exchanger 8 produces the aqueous ammonia at a temperature suitable for subtantially atmospheric storage in vessel 6. Valved conduit 18 provides for bypassing of water around heat exchanger 8 from conduit 2 to conduit 13, when desired.

It is also feasible to pass any substantial portion of the liquid ammonia feed from line 1 through heat exchanger 5, lines 4 and 3 to mixer 9 while passing the remainder of this feed through lines 7 and 3 to the mixer by proper manipulation of the valves in lines 1 and 4.

In FIGURE 2, liquid ammonia from a suitable source such as a railroad tank car is fed through line 30 containing control valve 32 into mixer 34 and through sparger 36. Water is passed through line 38, containing pump 39 and valve 40, and through indirect heat exchanger 42 into mixer 34. Aqua ammonia formed in mixed 34 is passed via line 44 through air fin cooler 46 where the temperature is reduced to within 10 to 15° of air temperature. The resulting partially cooled stream passes through line 48 and through heat exchanger 42 where it is cooled to about 15 to 25° of water temperature. The cooled product stream passes through line 50 containing backpressure regulator 52. A flexible conduit 54 connects line 50 with a truck tank 56 or other suitable storage and transportation facility for transport of the aqua ammonia to the customer.

The proportioning of the flow of the liquid $NH_3$ and water may be effected with the arrangement shown in FIGURE 2 in the same manner as illustrated in FIGURE 1 by the use of orifices in these flow lines and operation of valves 32 and 40 by instrument 17.

In order to produce aqueous ammonia solutions of a predetermined ammonia concentration I can employ a ratio flow controller assembly 17 (FIGURE 1) for proper proportioning of the liquid ammonia or water to the liquid ammonia. Ratio flow controller assemblies are well understood in the fluid flow control art and the description of assembly 17 herein will be brief. An orifice plate assembly is positioned in conduit 1 and a signal emitted from this orifice plate assembly is transmitted to the instrument proper of the flow control assembly. A similar orifice plate assembly is positioned in conduit 2 for measuring the rate of flow of the water. The signal emitted from this orifice plate assembly is also transmitted to the instrument of the assembly. A signal is then emitted from the controller of this assembly for regulation of the motor valve in conduit 2 to proportion the flow of water to the flow of ammonia in conduit 1. Other means are also used for proportioning the liquid ammonia and water, such as Rotameters for observing the stream flows followed by manual adjustment of flow control valves. If desired to simplify the equipment further, the mixture can be analyzed for ammonia and the proportioning regulated manually.

The invention is illustrated by the following examples which are not to be construed as unnecessarily limiting the invention.

EXAMPLE I

From a tank car of anhydrous liquid ammonia at about 80° F., the liquid is passed at a rate of about 2.65 gallons per minute through conduits corresponding to conduits 7 and 3 into a mixer corresponding to mixer 9. Water at about 100° F., and previously used in a heat exchanger corresponding to exchanger 8, is passed at the rate of about 4.74 gallons per minute by way of a conduit corresponding to conduit 13 into the sparger in which the ammonia and water are thoroughly mixed, resulting in the production of hot aqeuous ammonia at about 160° F. The water prior to heat exchange had a temperature of about 60° F. The mentioned proportions of ammonia and water produce a 25 percent by weight solution of ammonia. The heat of solution of the mentioned amounts of ammonia and water under the conditions mentioned is about 246,000 B.t.u. per hour. The air fin cooler removes about 158,000 B.t.u. per hour. The aqueous ammonia temperature at the air fin cooler outlet is about 110° F. The heat exchanger 8, employing the 4.74 gallons of water per minute at 60° F., cools the aqueous ammonia from the air fin cooler to a temperature of about 90° F., which is suitable for storage under 2 or 3 inches of water pressure. The water issuing from the heat exchanger corresponding to exchanger 8 has a temperature of about 87° F.

By using a heat exchanger corresponding to exchanger 5 the aqueous ammonia can be cooled further, such as to the range of 30 to 35° F., or a portion of the load can be removed from the air fin cooler and yet produce aqueous ammonia suitable for substantially atmospheric storage. As an alternative, recirculation of stored product from tank 6 to line 14 (as shown) is advantageous in preventing excessive pressure build-up in tank 6.

EXAMPLE II

Portable plants were assembled substantially in accordance with the arrangement of FIGURE 2 having a capacity of about 800 gal. per hr. (g.p.h.). Two of these plants have been operated in Minnesota and one in North Dakota in preparing 25% aqua ammonia using liquid NH₃ from a railroad tank car. The typical data from these operations are presented in the table below.

Table

| Location | $H_2O$ (g.p.m.) | $H_2O$ (° F.) | Air (° F.) | $NH_3$ (° F.) | Aqua $NH_3$ (° F.) | | |
|---|---|---|---|---|---|---|---|
| | | | | | Mixer | Air Fin | $H_2O$ Cooled |
| Minn. (1) | 10 | 65 | 82 | 69 | 150 | 106 | 84 |
| N. Dakota | 8 | 45 | 56 | 51 | 117 | 74 | 55 |
| Minn. (2) | 10.5 | 50 | 35 | 44 | 134 | 78 | 65 |

EXAMPLE III

In producing 25% aqueous ammonia from liquid ammonia of 85° F. temperature and 80° F. water with atmospheric temperature of about 85° F. using the apparatus of FIGURE 2, a product stream of 90° F. is produced. The feed water is heated to 93° F. in the heat exchanger with the product stream just downstream of the air cooling step wherein the aqua ammonia is cooled from 151° F. (mixer outlet temperature) to about 100° F.

This example illustrates relatively adverse temperature conditions, particularly water temperature, under which aqua ammonia can be produced at 90° F., suitable for storage in low pressure facilities, without heat exchanging with vaporizing NH₃ feed. The higher the product stream temperature as it goes into the air fin cooler, the more efficient the cooling in this step. Hence, even though the feed water is heated from a temperature of 80° F. to 93° F. in the final cooling step, the additional heat carried into the mixer by this hot feed water is easily removed in the air fin cooling step.

To illustrate, if the feed water is not heat exchanged with the aqua ammonia in the final cooling step, this feed water is passed into the mixer at the lower temperature of 80° F. and a lower outlet product temperature from the mixer results. However, the temperature differential between this lower product temperature and atmospheric is now lower and air fin cooling is less efficient. To be specific, the product outlet temperature from the mixer with 80° F. feed water is about 142° F. instead of 151° F. The air fin cooler then cools the product stream to only about 98° F. as compared to 100° F. with the hotter product stream. This demonstrates the definite advantage of cooling with feed water even at 80° F. to produce a product temperature of 90° F. as compared to 98° F. without the feed water cooling step.

The process and apparatus disclosed herein is suitable for producing aqueous ammonia of other concentrations than 25 percent by weight, such as 20 or 30 percent by weight. When producing other concentrations, as will be realized by those skilled in such art, the heats of solution and temperature will vary accordingly, but the principles involved are as herein disclosed.

By employing the system illustrated in FIGURE 1 with vaporizing ammonia in exchanger 5, aqueous ammonia can be cooled to a substantially lower temperature than the above-mentioned 90° F. such as to the range of 30 to 60° F., depending upon the proportion of the NH₃ feed vaporized in or passed to exchanger 5. In large aqueous ammonia storage tanks where ammonia vapor is withdrawn, compressed, condensed and returned to the tank, preferably as aqueous ammonia, it is particularly advantageous to use the ammonia exchanger 5 to cool the aqueous ammonia to temperatures below 90° F.

The following data illustrate temperature conditions for producing aqueous ammonia containing 25 percent by weight ammonia:

| Liquid $NH_3$ | | Water, ° F. | Mixer Outlet, ° F. | Recommended Back Pressure at Mixer 9, p.s.i.g. |
|---|---|---|---|---|
| P.s.i.g. | ° F. | | | |
| 114.1 | 70 | 70 | 147 | 32 |
| 114.1 | 70 | 80 | 153 | 37 |
| 114.1 | 70 | 90 | 160 | 43 |
| 114.1 | 70 | 100 | 167 | 48 |
| 138.3 | 80 | 80 | 155.5 | 39 |
| 138.3 | 80 | 90 | 163 | 45 |
| 138.3 | 80 | 100 | 169.5 | 51 |
| 165.9 | 90 | 90 | 166 | 47 |
| 165.9 | 90 | 100 | 172.5 | 53 |
| 197.2 | 100 | 100 | 175 | 56 |
| 232.3 | 110 | 100 | 178 | 59 |

While certain embodiments of the invention have been described for illustrative purposes, the invention obviously is not limited thereto.

I claim:
1. A process for producing a concentrated aqueous ammonia stream from a stream of liquid ammonia at about atmospheric temperature and a stream of water at a temperature of not more than 65° F., which comprises the steps of:
   (1) mixing all of said stream of ammonia and all of the heated stream of water from step (3) in a single mixing zone under substantial pressure to form a hot stream of aqueous ammonia at a substantially higher temperature than resulting from mixing with said stream of water at said temperature of not more than 65° F.
   (2) passing all of the hot stream of aqueous ammonia of step (1) thru an air-fin cooler to substantially reduce the temperature thereof;
   (3) passing all of said stream of water at said temperature of not more than 65° F. in indirect heat exchange with all of said stream of aqueous ammonia downstream of step (2) to cool said aqueous ammonia to a temperature of not more than atmospheric; and
   (4) passing the cooled stream of aqueous ammonia of step (3) to a closed storage zone.
2. The process of claim 1 wherein the flow of water and liquid ammonia are sensed and proportioned so as to produce about 25 weight percent aqueous ammonia.
3. In a process for producing a concentrated aqueous ammonia stream from a feed stream of liquid ammonia at about atmospheric temperature and a feed stream of water at a temperature not above 65° F. by mixing said feed streams in a single mixing zone under substantial pressure, resulting in a substantial rise in temperature, and withdrawing a stream of hot aqueous ammonia as the product of the process, the improvement comprising the steps of:
   (1) passing all of said stream of hot aqueous ammonia in indirect heat exchange with forced atmospheric air so as to reduce the temperature of said stream to within about 10 to 25° F. of air temperature; and
   (2) passing all of the resulting cooled stream of aqueous ammonia of step (1) in indirect heat exchange with all of the feed stream of water at said temperature passing to said mixing zone to reduce the temperature of said aqueous ammonia to not more than atmospheric temperature and raise the temperature of said feed stream of water; and (3) passing the heated stream of water from step (2) to said mixing zone as said feed stream of water.

4. The process of claim 3 wherein the flow of water and liquid ammonia are sensed and proportioned so as to produce about 25 weight percent aqueous ammonia.

5. In a process for making aqueous ammonia solution from a feed stream of liquid ammonia and a feed stream of water comprising mixing said feed streams in a single mixing zone with a substantial rise in temperature and withdrawing a stream of hot aqueous ammonia solution, the improvement comprising the steps of:

(1) passing at least a substantial portion of said stream of liquid ammonia in indirect heat exchange with the stream of aqueous ammonia solution to cool said solution and to heat and vaporize a substantial portion of said ammonia stream prior to passing same to said zone;

(2) indirect heat exchanging all of said stream of water, before passing same to said mixing zone, with all of said stream of aqueous ammonia solution upstream of step (1) so as to cool said stream of solution and heat said stream of water prior to passing same to said zone, step (2) producing a substantially higher solution stream temperature from said mixing zone than is obtained without said step; and (3) indirect heat exchanging all of the stream of hot aqueous ammonia solution upstream of step (2) with forced atmospheric air to substantially cool said solution, the higher initial solution temperature in this step increasing the efficiency of cooling with said air, thereby producing a cooler stream of solution in step (1).

6. The improvement in claim 5 wherein all of the feed stream of liquid ammonia is heat exchanged in step (1), the cooled solution from step (1) is passed to a closed storage tank, and stored aqueous ammonia solution is recycled from said storage tank to said aqueous solution just upstream of step (1).

7. The process of claim 5 wherein said aqueous solution of ammonia is cooled to a temperature substantially below 90° F.

8. The process of claim 5 wherein said aqueous solution of ammonia is cooled to a temperature in the range of about 30 to 60° F.

References Cited by the Examiner

UNITED STATES PATENTS 3,008,801  11/1961  Adams _____ 23—193 X

MILTON WEISSMAN, *Primary Examiner.*

EARL C. THOMAS, OSCAR R. VERTIZ, *Examiners.*